United States Patent
Ono et al.

(10) Patent No.: US 6,927,808 B2
(45) Date of Patent: Aug. 9, 2005

(54) LIQUID CRYSTAL DISPLAY DEVICE

(75) Inventors: Kikuo Ono, Mobara (JP); Ryutaro Oke, Mobara (JP); Takahiro Ochiai, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 0 days.

(21) Appl. No.: 10/455,425

(22) Filed: Jun. 6, 2003

(65) Prior Publication Data

US 2003/0227580 A1 Dec. 11, 2003

(30) Foreign Application Priority Data

Jun. 6, 2002 (JP) .................................. 2002-165060

(51) Int. Cl.⁷ .............................................. G02F 1/136
(52) U.S. Cl. ........................................ 349/43; 349/141
(58) Field of Search ................................. 349/141, 142, 349/143, 144, 145, 146, 147, 148, 38, 39, 42, 43

(56) References Cited

U.S. PATENT DOCUMENTS 6,704,066 B2 * 3/2004 Tsumura et al. ............... 349/42
6,747,722 B2 * 6/2004 Ono et al. ................... 349/141

* cited by examiner

Primary Examiner—Kenneth Parker
Assistant Examiner—David Y. Chung
(74) Attorney, Agent, or Firm—Antonelli, Terry, Stout & Kraus, LLP

(57) ABSTRACT

In a liquid crystal display device of the active matrix type using in-plane switching (IPS), with at least four transmission regions being formed within a single pixel area surrounded by neighboring gate wiring lines and neighboring drain wiring lines disposed in a direction transverse to the drain wiring lines, a multilayer structure formed of two layers of conductive films with an insulating film sandwiched therebetween is provided at a pixel electrode extending from either one of the neighboring gate wiring lines toward the interior of the pixel and causes one of these two-layer conductive films (i.e. lower pixel electrode placed on the substrate side) is configured to bend or "crank" into a hook-like shape at a central portion of the pixel areas while letting its planar shape be adjacent to one of the neighboring drain lines at the half of the pixel area and also letting it be adjacent to the other of the neighboring drain lines at the other half, thereby widening the viewing angle of an image to be visually displayed on the liquid crystal display device and also brightening the image.

8 Claims, 6 Drawing Sheets

LIQUID CRYSTAL DISPLAY DEVICE

BACKGROUND OF THE INVENTION

The present invention relates in general to liquid crystal display devices and, more particularly, to liquid crystal display devices of the active matrix type in which thin-film transistors (TFT) are used. This invention also relates to a method of manufacture of such devices.

Liquid crystal display devices include the in-plane switching (IPS) type of liquid crystal displays, which are designed to apply a lateral electric field to a liquid crystal gap between upper and lower substrates having a layer of liquid crystal material interposed therebetween. The IPS-mode liquid crystal displays are considered to employ a display scheme that is capable of satisfying the requirements for higher image quality, and they have experienced a variety of improvements in image quality.

In IPS-mode liquid crystal display (LCD) devices, a widely used approach is to employ a scheme for switching liquid crystal orientation by use of a lateral electric field which is created between two layers of metal electrodes having an insulating film sandwiched therebetween. However, compared to display devices of the type using twisted nematic (TN) methods, this approach suffers from various problems; for example, it is difficult to enlarge the aperture ratio of picture elements or "pixels", and, the light utilization efficiency remains low in value. To avoid these problems, a back-light unit that is typically used therein must be able to provide increased luminance. This backlight luminance increase makes it difficult for an LCD module to achieve low power consumption, such as is required for notebook personal computers (PCs) and handheld or "mobile" electronic tools.

In order to solve this problem, a technique has been proposed, for example, in Published Unexamined Japanese Patent Application No. 2002-98982.

Additionally, it is also known that active elements for liquid crystal switching are configured not only from thin-film transistors (TFTs) having their channel regions (switching portions) made of amorphous silicon (noncrystalline silicon), but also from TFTs with channel regions made of polysilicon (polycrystalline silicon).

SUMMARY OF THE INVENTION

IPS-type liquid crystal display devices are low in aperture ratio, and, thus there is a used for improvements which will offer a higher aperture ratio, that is, a higher optical transmissivity. Typically, pixels are designed to have a comb-like electrode structure using a single pixel electrode in an area that is interposed between common electrodes—in other words, a structure in which each pixel is bisected. However, the inventors' study has revealed that structures with a pixel divided into more than four parts require special designs for reducing display defects, such as cross-talk, while at the same time further increasing the aperture ratio.

The present invention, as disclosed herein, provides an approach to solve the newly found problems stated above, and an object of this invention is to further increase the aperture ratio, while simultaneously reducing the problem of operation failure and crosstalk that are unique to an IPS display-mode liquid crystal display device. Such a device has a common electrode overlying a drain wiring line, with an organic film laid therebetween, and also has a pixel electrode over the organic film, while having more than four open regions that are surrounded by the common and pixel electrodes in a cross-sectional structure transverse to part between neighboring drain wiring lines.

These and other objects, features and advantages of the present invention will be apparent from the following more detailed description of preferred embodiments of the invention.

Some major aspects for attaining the object in accordance with this invention are as follows.

(1) In an active matrix type liquid crystal display device having a first substrate and a second substrate, which are disposed to face each other with a liquid crystal layer interposed therebetween, and having above the first substrate a plurality of gate wiring lines and a plurality of drain wiring lines crossing the plurality of gate wiring lines in a matrix form and also thin-film transistors formed at respective cross points of the gate wiring lines and the drain wiring lines, with a pixel being constituted from an area surrounded by neighboring gate wiring lines and neighboring drain wiring lines, the device is arranged to have a plurality of pixel electrodes, at least two pixel electrodes thereof having a first area that is constituted by a linear portion formed from upper and lower layers with an insulating film sandwiched therebetween and a second area that is constituted by a linear portion provided only at an upper portion of the insulating film. The two pixel electrodes are different from each other in order of the first area and second area of the pixel electrodes; and, portions formed at a lower layer of the insulating film making up the first area are connected to each other at the two pixel electrodes.

(2) The distance between one pixel electrode of the two pixel electrodes and one of two drain wiring lines disposed on the opposite sides of a pixel is selected to be greater than twice the distance relative to the remaining drain wiring line, whereas the distance between the remaining one of the two pixel electrodes and the remaining drain wiring line of the two drain wiring lines disposed on opposite sides of the pixel is greater than twice the distance relative to the one drain wiring line.

DETAILED DESCRIPTION

Representative structures incorporating the principal features of this invention will be explained in conjunction with illustrative embodiments.

Embodiment 1

Figure 1:
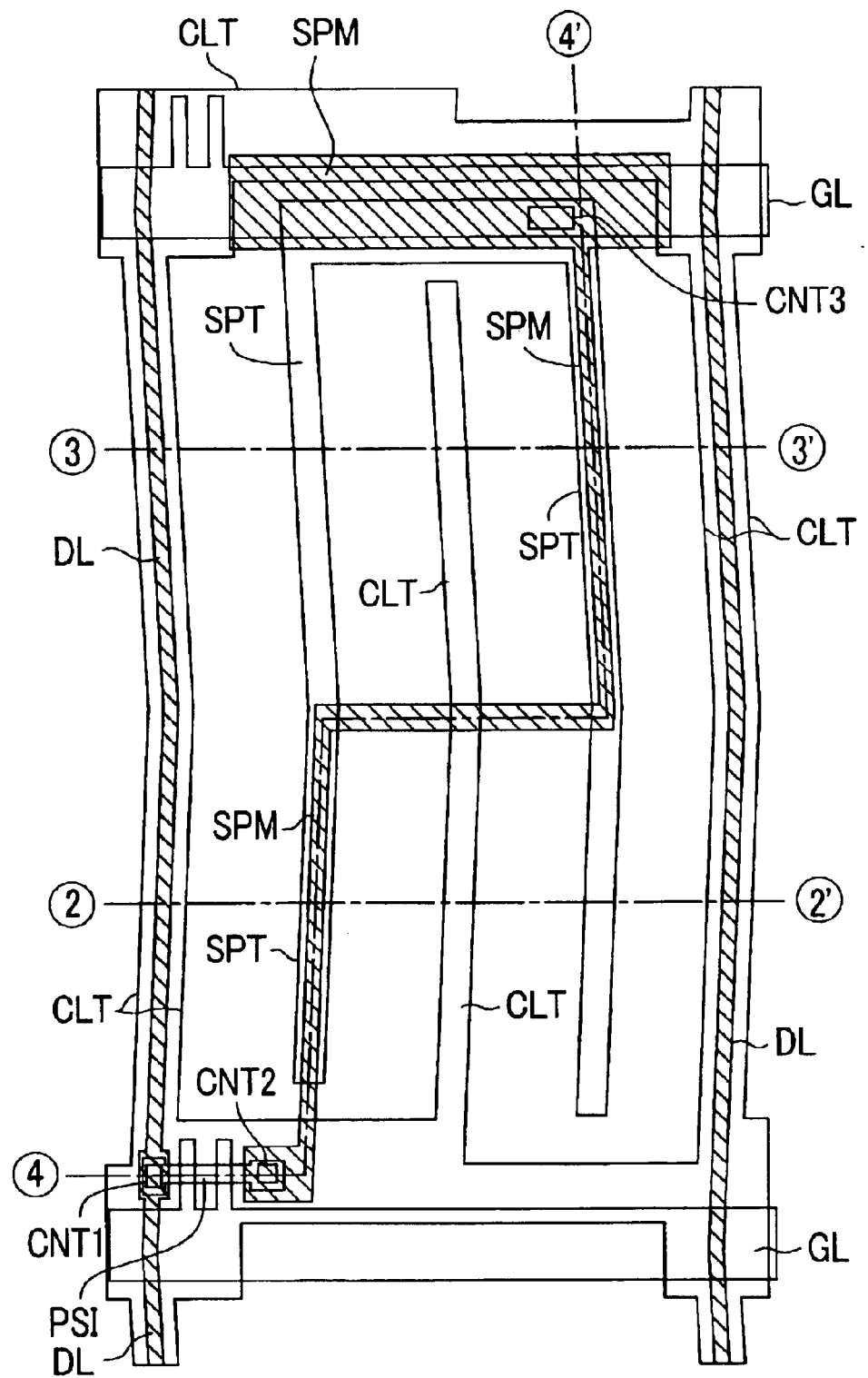
FIG. 1 is a diagrammatic plan view of a main part of a pixel of a TFT liquid crystal display device in accordance with one embodiment of the present invention.
Figure 2:
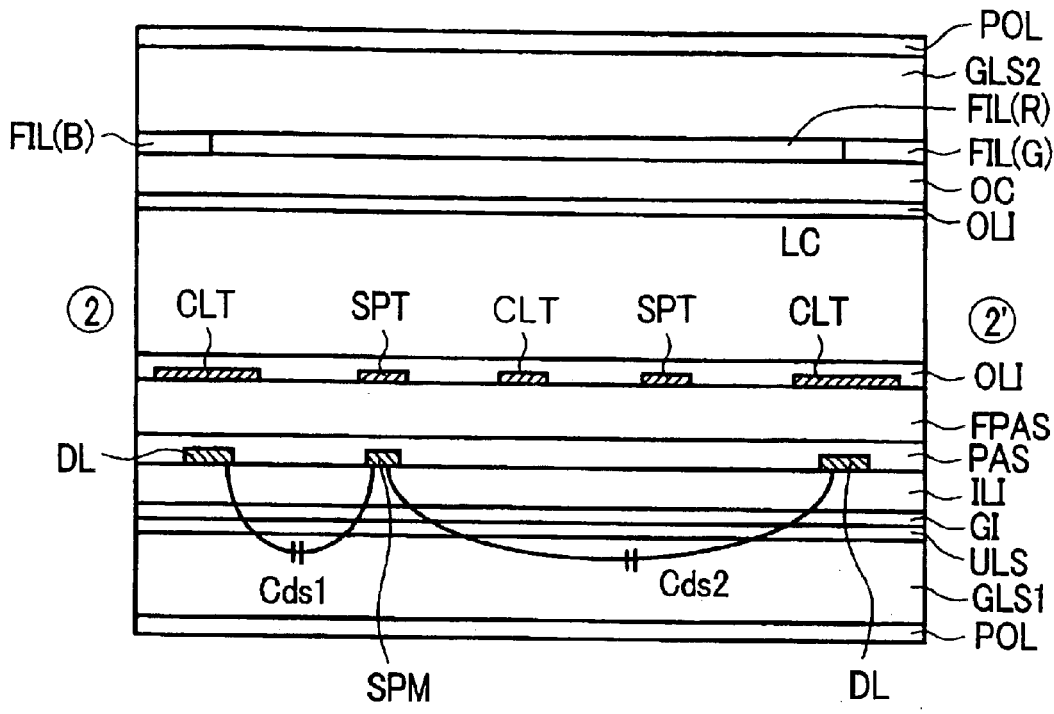
FIG. 2 is a cross-sectional view taken along line 2–2' of FIG. 1.
Figure 3:
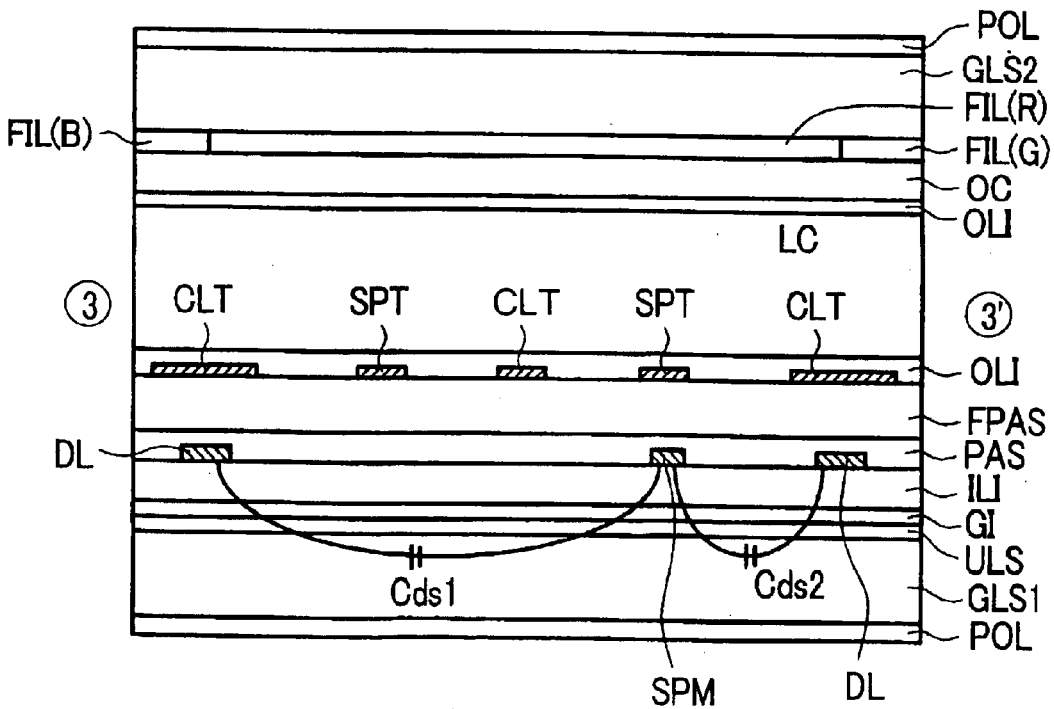
FIG. 3 is a sectional view taken along line 3–3' of FIG. 1.
Figure 4:
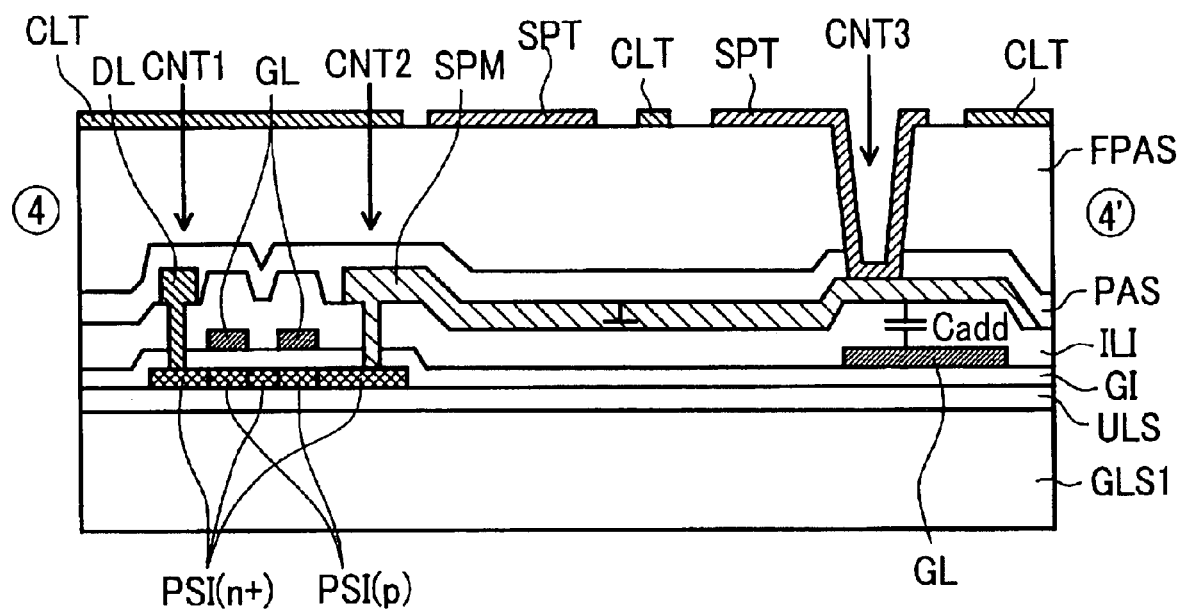
FIG. 4 is a sectional view taken along line 4–4' of FIG. 1.

FIG. 1 is a plan view of one of the pixels (picture elements) of a liquid crystal display device in accordance with one embodiment of the invention, and FIGS. 2 through 4 are cross-sectional views of the pixel as seen along lines 2–2', 33' and 4–4', respectively, in FIG. 1. In these drawings, the numerals indicative of section lines are encircled for purposes of providing visual emphasis of the indicated sections. Note that these drawings indicate a main part of the structure for explanation purposes and that orientation films are eliminated from some of the drawings. Also note that some structure on the opposite or "counter" substrate side also is eliminated in some drawings for purposes of convenience in illustration only.

FIG. 1 shows a schematic planar pattern of a representative one of the pixels, which pixel is arranged so as to be surrounded by a pair of neighboring gate wiring lines GL and a pair of neighboring drain wiring lines DL. The laser gate wiring line GL also functions as the gate electrode of a thin-film transistor (TFT), whose semiconductor layer is made of polysilicon (poly-crystalline silicon) PSI, for supplying a voltage which drives the TUFT to turn it on and off to effect switching the pixel. For instance, a current supplied to the polysilicon PSI layer (shown lower-left in FIG. 1) from the drain line DL shown on the left in FIG. 1 (one of the neighboring drain wiring lines) is supplied to a liquid crystal capacitance and hold capacitance (charge-holding capacitance helping the liquid crystal capacitance hold a charge) in the pixel, thereby to apply an image voltage (drain voltage) to each capacitance at the timing at which one of the neighboring gate wiring lines GL (shown at lower side of FIG. 1) applies a turn-on voltage to the polysilicon PSI layer. Consequently, a metal pixel electrode SPM (connected to the low-temperature polysilicon PSI), which extends up to a central portion of the pixel, and a transparent pixel electrode SPT coupled thereto become equal in potential to the applied image voltage.

The current is caused to flow from the drain wiring line DL through a first contact hole CNT1 into the polysilicon PSI. The current in this polysilicon PSI flows into the metal pixel electrode SPM through a second contact hole CNT2. The metal pixel electrode SPM extends beneath the left hand transparent pixel electrode SPT up to a central portion of the pixel, at which point the drain wiring line DL and transparent pixel electrode SPT are bent. At this central point, the metal pixel electrode SPM curves in a direction substantially perpendicular to the elongate direction of the drain wiring line DL, extends across a transparent common electrode CLT and, thereafter, at a point under the right hand transparent electrode SPT, it again extends toward the other of the neighboring gate wiring lines GL (shown at upper side of FIG. 1) beneath the transparent electrode SPT.

Since the other of the neighboring gate wiring lines GL contributes to the operation of another of the pixels that is adjacent (in an extension direction of the drain wiring line DL) to this pixel (as FIG. 1 shows mainly), the neighboring gate wiring line GL will be denoted as "a gate wiring line of the prior stage" hereinafter. This denotation is based on the assumption that the other of the pixels (partially shown at the upper side in FIG. 1) is scanned prior to the illustrated pixel, and if the other of the pixels is scanned next to the illustrated pixel, the gate wiring line of the prior stage is renamed "a gate wiring line of the next stage". On the other hand, the one of the neighboring gate wiring lines GL used in scanning the illustrated pixel (i.e. the pixel mainly exemplified in an explanation of an embodiment) is denoted as "a gate wiring line of the present stage" also. However, the scanning sequence of the one of the pixels and the other of the pixels is not limited in this embodiment.

As shown in the upper side of FIG. 1, the metal pixel electrode SPM forms a hold capacitance together with the gate wiring line GL of the prior stage (the prior stage gate wiring line, hereinafter) and contacts a transparent electrode SPT, overlying an insulating film, through a third contact hole CNT3 at this position. The transparent electrode SPT is laid out on the pixel to have a "U"-like planar shape, by way of example.

A common electrode potential of the other electrode that makes up the liquid crystal capacitance together with the pixel electrode is applied along a route or path which will be described as follows. The transparent common electrode wiring line CLT is disposed in such a way as to shield the above-noted wiring line at its upper part via an insulating film of low dielectric constant above the gate and drain wiring lines GL and DL. The transparent common electrode wiring line CLT is branched into the pixel area to thereby function as the common electrode that drives the liquid crystals together with the pixel electrode SPT. In this way, the transparent common electrode wiring line CLT is laid out to have a mesh-like pattern in such a manner as to cover or overlie the gate and drain wiring lines GL and DL, and it is connected and tied to a low-resistance wiring line made of a metal in a display screen peripheral area. This low-resistance wiring line is the one that acts as a bus line with a common potential.

In the IPS liquid crystal display device, the value defined by a lateral electric field between the transparent common electrode CLT and the transparent pixel electrode SPT of FIG. 1 is a liquid crystal capacitance, so that this value is less than or equal to half of that in liquid crystal display devices of the type using vertical electric field methods such as the TN scheme, which defines the liquid crystal capacitance between electrodes disposed on upper and lower opposing substrates, respectively. Due to this, only in the lateral electric field scheme, in which both the common electrode and the pixel electrode are disposed on one substrate, the wirinq-line resistance specification of the transparent common electrode wiring line CLT may offer the capability to lessen the wiring line delay even when using transparent electrode material with increased resistance values, to thereby make it possible to obtain a higher image quality. Obviously, any available transparent electrode materials are employable, including but not limited to indium-zinc-oxide (IZO) and indium-tin-zinc oxide (ITZO).

The voltage potentials of this common electrode and the common electrode wiring line are such that an almost mid-point potential of the pixel potential is set, which is changed into an AC form in units of frames by way of example (as will be explained in detail again with reference to FIG. 7). The pixel electrode potential and common electrode potential constitute the liquid crystal capacitance, and, simultaneously, a difference between these potentials is used to create an electric field within the liquid crystal layer, causing an image to be visually displayed by use of the common voltage and an image voltage, as supplied from the drain wiring line DL. On the other hand, a potential of the hold capacitance is formed between the pixel electrode potential and a prior stage gate wiring line, with the gate wiring line (of the present stage) being scanned. After the potential of the prior stage gate wiring line has been scanned, the potential of the gate wiring line is kept at a stabilized constant potential level during scanning of a gate wiring line of a TFT that drives a corresponding pixel and, thus, becomes an electrode that makes up the hold capacitance.

One of the principal features of this embodiment lies in the planar pattern of the metal pixel electrode SPM within a single pixel area. The metal pixel electrode SPM functions to transmit the pixel potential that was applied through the second contact hole CNT2 to a third contact hole CNT3 in a direction toward the transparent pixel electrode SPT at a portion over the gate wiring line GL. If the only purpose of transmission of the voltage of the pixel potential, the metal pixel electrode SPM may be arranged in a layout such that only the lower part of the transparent pixel electrode SPT nearest to a drain wiring line DL, as seen on the left hand side of FIG. 1. can be disposed with the shortest distance to the prior stage gate wiring line GL. However, the metal pixel electrode SPM of this embodiment is specifically disposed so that, up to almost a central portion of the transmission area between the neighboring gate wiring lines GL it extends beneath the transparent pixel electrode SPT which is nearest to the left hand drain wiring line DL, as seen on the left hand side in the drawing and it then curves at a location near the center to extend in a direction substantially perpendicular to the drain wiring lines. Thereafter, it extends under the right hand transparent pixel electrode SPT that is nearest to a drain wiring line DL on the right hand side of the drawing so as to reach the prior stage gate wiring line GL. As apparent from FIG. 1, this is a very characteristic pattern. This pattern forms a layout that permits the distances from the drain wiring lines DL to the metal pixel electrode SPM to become substantially symmetrical with respect to the mutual drain wiring lines within a single pixel. With such an arrangement, it becomes possible to reduce certain particular phenomenon, such as operation failure or crosstalk, that would otherwise occur due to unwanted potential variations of the drain voltage, as disposed by the present inventors, as will be later described in detail with reference to FIGS. 2 and 3. At this time, with the use of the structure in which the metal pixel electrode SPM is curved within one pixel to provide an almost symmetrical layout pattern within the one pixel, it is possible to cause the capacitance being formed between the upper-side transparent pixel electrode SPT and the metal pixel electrode SPM to be substantially equal with respect to two pixel electrodes SPT. This in turn makes it possible to further stabilize the hold characteristics within the pixel.

Furthermore, since the two transparent pixel electrodes SPT are arranged such that a capacitance is formed between each electrode and the metal pixel electrode SPM, the pixel potential is supplied by this capacitance also. Due to this, even when the transparent pixel electrode SPT is electrically disconnected or "open-circuited" at a portion thereof, the intended pixel potential supplement is still achievable by this capacitance, thus enabling performance of proper display operations. In this way, it is possible to provide a liquid crystal display device in which there is less occurrence of dot defects, and which is very high in manufacturing yield. This is so because any accidental electrical disconnection of the gate wiring lines GL and drain wiring lines DL is correctable and repairable in TFT processes. In addition, as the common potential is supplied by the transparent common electrode CLT in a matrix form, the influence of such disconnection will no longer structurally occur. And, electrical shorting is correctable even after product completion by cutting and separating a shorted portion(s) using a laser, for example. Although the only difficulty in such repair concerned dot defects occurring due to pixel electrode disconnection, the use of this structure makes it possible to avoid this problem also because of its ability to retain a display owing to capacitive coupling. Thus, it is possible to realize an extremely high production yield. And, in this case, the yield is further improved by designing the metal pixel electrode SPM so that it is made of a metal and is located beneath the transparent pixel electrode associated therewith. More specifically, the metal electrode is higher in micromachining accuracy than transparent electrodes made of indium-tin-oxide (ITO) or the like, while at the same time offering a finer line and enhanced electrical disconnection preventability. Furthermore, although one cause for disconnection of metal wiring lines is infiltration of etching liquids at the time of micromachining during later process steps, disposing the metal pixel electrode SPM beneath the transparent pixel electrode SPT results in a structure in which the underlying metal pixel electrode SPM is protected by its overlying transparent pixel electrode SPT during the etching processes. Thus, it becomes possible to further improve the disconnection preventability, thereby enabling realization of further improvements in the manufacturing yield.

Further, note that the position at which the metal pixel electrode SPM curves is disposed along a transversal area which couples those points at which the drain wiring lines DL and transparent common electrode CLT, plus transparent pixel electrode SPT, are bent. This curvature is provided for effecting a change in the direction of an electric field between the upper half part and lower half part of such planar pattern, with this position serving as a boundary, to thereby preclude gradation or gray scale reversal when looking from a specific direction. Accordingly, the area that couples these curve points is inherently a region in which display-use optical elements change in light distribution direction, and, thus, the liquid crystal molecules are difficult to control in this region; therefore, the area does not contribute to optical transmission in any way. Consequently, even when the metal pixel electrode SPM extends across this area, the transmissivity hardly decreases, as long as the electrode is narrow in width, thereby enabling provision of the intended liquid crystal display device having increased aperture ratios and enhanced brightness. The metal pixel electrode SPM is a wiring line within a single pixel and is not expected to serve as a power feed for the entire display screen, unlike the gate wiring lines GL and drain wiring lines DL, whereby currently established minimum feature size rules are usable, so that the line may be made narrower than the individual gate wiring line GL, to thereby enable achievement of further improvements in aperture ratio. Additionally, the line may also be made narrower than the individual drain wiring line DL. In this case, the aperture ratio is further improved.

FIG. 2 is a sectional view of the pixel as seen along line 2–2' of FIG. 1, which is a portion that extends across a one pixel area between neighboring drain lines DL. An underlayer insulating film ULS, which is structured from an $Si_3N_4$ film having a thickness of 50 nanometers (nm) and an $SiO_2$ film having a thickness of 120 nm, is formed on a non-alkali TFT glass substrate GLS1, having a distortion point of about 670° C. The underlayer insulating film ULS functions to prevent unwanted diffusion of an impurity, such as Na or the like, from the TFT glass substrate GLS1. On the underlayer insulating film ULS, a gate insulation film GI made of $SiO_2$ is formed. Disposed on the gate insulation film GI, there is a low-temperature polysilicon PSI for supplying a pixel potential.

An interlayer dielectric film ILI, made of $SiO_2$, is formed to cover the above-mentioned structure. Drain wiring lines DL are formed on the interlayer dielectric film ILI, wherein each drain wiring line DL has a three-layer metal film structure of Ti/Al/Ti. The metal pixel electrode SPM is formed by the same process and the same material as those of the drain wiring lines DL.

The layer is covered with two films, one of which is a dielectric protective film PAS made of $Si_3N_4$ and having a thickness of 200 nm, and the other is an organic protective film FPAS having a thickness of 2 micrometers ($\mu$m), wherein the latter is mainly comprised of acrylic resin material. On the organic protective film FPAS, a transparent common electrode wiring line CLT, made of indium-tin-oxide (ITO), is first formed to have a width greater than that of a drain wiring line DL. A transparent pixel electrode SPT, that is made of ITO and fabricated by the same process and the same material, is also formed on the organic dielectric film FPAS.

The wiring line materials mentioned in the explanation set forth above are merely exemplary and should not be interpreted as a limit on the scope of the invention.

Some major optical transmission regions are provided in four areas: (1) an area between the transparent common electrode CLT, overlying the left hand drain line DL, and a transparent pixel electrode SPT that is disposed to cover the metal pixel electrode SPM on the left hand side, as seen in FIG. 1; (2) an area between the left hand transparent pixel electrode SPT and the central transparent common electrode CLT, that extends upward from the upper side of gate wiring GL; (3) an area between the central transparent common electrode CLT and the right hand transparent pixel electrode SPT; and (4) an area between the right hand transparent pixel electrode SPT and a transparent common electrode wiring line CLT overlying the right hand drain wiring line DL. The transparent pixel electrode SPT and the transparent common electrode CLT are the electrodes which drive the liquid crystals.

On the other hand, the opposite substrate, which serves for sealing the liquid crystal material LS, is called the color filter (CF) substrate GLS2. This CF glass substrate GLS2 is formed such that color filters (FIL), which are made of organic material with color-displaying pigments being scattered on the liquid crystal side, are used as color filters which pass transmission light rays of blue (B), red (R) and green (G) in accordance with those colors, as assigned on a pixel basis—for example, "FIL(R)" for red. On the inner side thereof, there is an overcoat film OC, which is made of organic material. Although the OC film may be eliminated, it is desirable that this film be used for purposes of planar surface improvement. An orientation film OLI is printed on the surfaces of the CF substrate GLS2 and TFT substrate GLS1 which are in contact with the liquid crystals LC and rubbing is applied thereto to thereby control the initial orientation or alignment direction(s). In addition, polarization plates POL are pasted to the outside surfaces of the CF glass substrate GLS2 and TFT glass substrate GLS1. These polarizers POL are designed to provide what is called the "cross nicol" state, in which the deflection axes are crossed at right angles between the opposite glass substrates.

Figure 5:
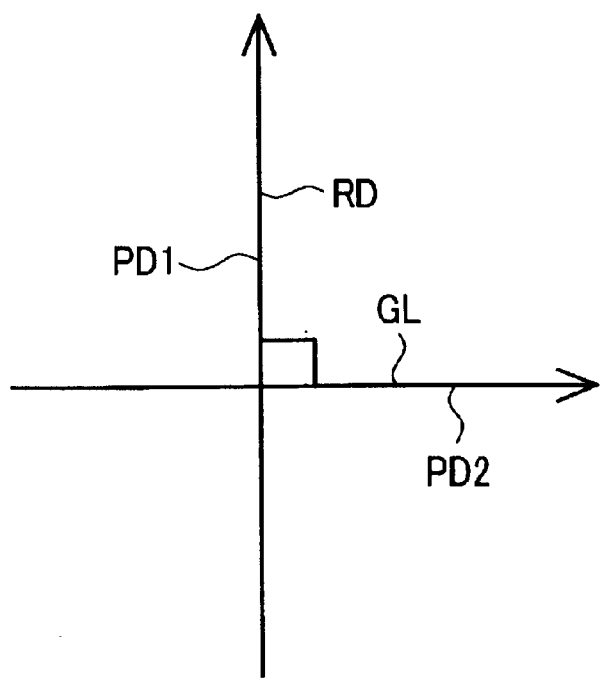
FIG. 5 is a diagram illustrating a relationship of a polarization plate versus an initial orientation direction in accordance with one embodiment of the invention.

The angular relationship of the rubbing direction and the polarizer is shown in FIG. 5. One polarized light axis PD2 extends in the same direction as GL, while the other polarized light axis PD1 extends in an orthogonal direction relative to GL. Additionally, the rubbing direction RD in the upper and lower substrates is set to extend in a direction orthogonal to GL. With such an arrangement, a so-called "normally black" mode layout is provided; further, with a pixel pattern having a curved shape, such as shown in FIG. 1, a multi-domain design is achieved. Obviously, the case of an anti-multi-domain also is possible within the scope of the present invention; in such case also, it is required that the polarizer layout permit establishment of the cross nicol state.

A so-called black matrix BM is not formed at the CF substrate GLS2 in this cross-section. Combining the colors of the color filter FIL is produced above the transparent common electrode wiring lines CLT, which are disposed to cover or coat the drain wiring lines DL.

Desirably, the transparent common electrode wiring lines CLT, which overlie the drain wiring lines DL, are designed so that the width of each wiring line CLT is selected to be more than two times larger than the width of a drain wiring line DL. This is required in order to achieve a shielding of the drain potential, to thereby preclude the risk of operation failure or malfunction of the IPS liquid crystal display device that otherwise would occur basically due to application of other electric fields other than a common electrode potential and a pixel potential to the liquid crystals. Also, note that in IFS liquid crystal display devices using positive-type liquid crystal materials, no light rays transmit and penetrate on the inner side thereof, even at portions over the transparent electrodes. This is because any lateral electric fields are applied over widened electrodes, resulting in the liquid crystal molecules being prevented from rotating in any way. However, in a region of about 1.5 $\mu$m, as measured from an end portion of transparent electrode toward its inside along the width, a fringe-like lateral electric field is applied, permitting transmission of light rays.

For the liquid crystals LC, the electric fields being applied to the transparent pixel electrode SPT and transparent common electrode CLT are used to drive the liquid crystals. As previously stated, the electric field created by an image voltage, in the event that the drain wiring line DL drives those pixels other than a target one, is such that the organic protective film FPAS is thickened, while its overlying transparent common electrode CLT is designed to have an increased width, whereby such an electric field component will no longer leak into the liquid crystals LS, so that any operation failure of the images will no longer occur due to this electric field. In this way, there is less influence upon the part that spans the area from the drain wiring line DL to the upper part in the sectional structure of FIG. 2 that is, the liquid crystal LC side.

However, an electric field that extends from the drain wiring line DL to the TFT glass substrate GLS1 can indirectly cause an operation failure of the image quality. The TFT glass substrate GLS1 is mainly comprised of $SiO_2$, with a relative dielectric constant of 4. However, unlike quartz crystals, it contains, as an impurity, a high relative dielectric constant material, such as alumina, so that the resulting relative dielectric constant is as high as 6 to 7. On the other hand, the organic protective film is made of an acrylic resin having a relative dielectric constant of 3 and with its thickness being as large as 2 $\mu$m. Accordingly, the influence of an electric field (Cads in FIG. 2) that penetrates the TFT glass substrate GLS1 from the left hand side drain wiring line DL, as seen in FIG. 2, to a portion between neighboring metal pixel electrodes SPM becomes larger due to the presence of a difference in relative dielectric constant between the organic protective film and the TFT glass substrate. Obviously, the influence of an electric field (Cds2 in FIG. 2) passing through the TFT glass substrate GLS1 from the right hand side drain wiring line DL, as seen in the drawing, on the metal pixel electrode SPM becomes smaller, because Cds2 extends over a greater distance than Cads between the respective drain wiring line DL and the metal pixel electrode SPM. More specifically, asymmetry occurs with respect to the position of the two drain wiring lines DL relative to the pixel electrode SPM. Due to this, a signal being held by the TFT of a pixel by a display image of one drain wiring line can often be affected by capacitive coupling, resulting in the risk of display image turbulence.

To avoid risk, with this invention, the metal pixel electrode SPM is specifically laid out so that it curves within a pixel as shown in FIG. 1, to thereby eliminate this asymmetry.

FIG. 3 is a cross-sectional view as seen along line 3–3' of FIG. 1. The cross-section shown herein is a profile which extends across neighboring drain wiring lines of an upper half pixel part, wherein the metal pixel electrode SPM that extends from the second contact hole CNT2 in the pixel plan view of FIG. 1 turns at a location near the center of the display screen and again extends toward the prior stage of the gate wiring line GL in a direction almost parallel to the drain wiring line DL. Although the structure above the TFT glass substrate GLS1 is substantially the same as that in the cross-section of FIG. 2, the main difference therebetween lies in the position of the metal pixel electrode SPM. The metal pixel electrode SPM is disposed on the interlayer dielectric film ILI with its upper portion covered by the protective film PAS and organic protective film FPAS. Further, the right hand transparent pixel electrode SPT is disposed to overlie the metal pixel electrode SPM. While the layout of the cross-sectional structure is basically the same as that of the structure of FIG. 2, in the structure as shown in FIG. 2, the metal pixel electrode SPM is positioned below the transparent pixel electrode SPT that is adjacent to the left hand side drain wiring line, as seen in the drawing; whereas, in the structure as shown in FIG. 3 the metal pixel electrode SPM is positioned below the transparent pixel electrode SPT that is adjacent to the right hand side drain wiring line DL, as seen in the drawing. With this design, in the structure shown in FIG. 3, the influence Cds2 of an electric field from the right hand side drain wiring line DL through the TFT glass substrate GLS1 becomes greater than the influence Cads of an electric field from the left hand side drain wiring line DL.

This results in a structure in which the electric field influence, in the planar structure of FIG. 1, through the TFT glass substrate GLS1 on the metal pixel electrode SPM is such that the metal pixel electrode SPM strongly receives the influence of the left hand side drain wiring line DL in a lower half area, as seen in the drawing, and receives the influence of an electric field of the right hand side drain wiring line DL in an upper half area, as seen in the drawing. Thus, it is possible to set the influence of the electric field from the neighboring drain wiring lines DL so that it becomes symmetrical with respect to the whole metal pixel electrode SPM.

The above-stated structure offers an advantage in the case of implementing a dot inversion drive method, which is a drive method of a TFT liquid crystal display device for achievement of a state in which polarity-different voltages are applied to the neighboring drain wiring lines, whereby crosstalk due to potential variations thereof may be reduced. More specifically, in case a constant voltage with a positive polarity is applied to the left hand side drain wiring line DL, while a voltage with the negative polarity is applied to the right hand side drain wiring line DL, as seen in FIG. 1, the metal pixel electrode SPM will no longer vary in potential, because the potential variation thereof is such that the distance from the metal pixel electrode SPM to the drain wiring line DL always stays the same in average within a one pixel area between neighboring gate wiring lines. Thus, the transparent pixel electrode SPT connected thereto also hardly varies in potential, resulting in prevention of any appreciable crosstalk generation.

Another method of retaining the symmetry of potential variation is available, which method employs a scheme for disposing the metal pixel electrode SPM at the entire lower part of two transparent pixel electrodes SPT adjacent to the drain wiring lines DL of FIGS. 2 and 3. Obviously the use of this scheme also makes it possible to prevent crosstalk, as stated above, although this would sometimes result in a decrease in optical transmissivity—namely, an aperture ratio reduction due to the fact that the metal pixel electrode SPM and the transparent pixel electrode SPT are incapable of being thinner than the minimum micromachine line width. However, the transparent pixel electrode SPT and transparent common electrode CLT are formed such that their portions spanning from the end portion thereof up to the electrode inside of 1.5 μm contribute to the transmission under the influence of a fringe electric field(s). Accordingly, in order to increase the aperture ratio in the IPS display device using such a transparent pixel electrode and transparent common electrode, it is effective to minimize the embedment of an opaque metal and low transmissivity semiconductor material at lower portions of the electrodes. Owing to this, the structure with the lower-layer metal pixel electrode SPM curving within a one pixel area, in the way described in detail with reference to FIG. 1, is capable of providing a liquid crystal display device with a high aperture ratio, while suppressing crosstalk. Also, note that the pixel center of FIG. 1 at which the metal pixel electrode SPM curves is an area in which each electrode curves and also an area in which liquid crystal molecules mutually invert, and, thus, no light inherently penetrates this area irrespective of whether the metal pixel electrode is present or absent, so that the aperture ratio is not newly lowered by the presence of such curved metal electrodes.

FIG. 4 is a cross-sectional view taken along line 4–4' of FIG. 1. This sectional view shows a portion of FIG. 1 which leads to the formation of a storage capacitance along the metal pixel electrode connected to a TFT of low-temperature polysilicon PSI. The left side of the sectional view of FIG. 4 shows a cross-section of the TFT. A metal oxide semiconductor (MOS) TFT is structured with the drain wiring line DL and metal pixel electrode SPM as its drain electrode and source electrode, and with the gate wiring line GL as its gate electrode, which is electrically insulated by a gate insulation film GI. A polysilicon layer PSI is disposed over the ULS layer. The drain wiring line DL is connected via the first contact hole CNT1, as defined in the gate insulation film GI and interlayer dielectric film ILI, to a heavily-doped n type layer PSI(n+) having phosphorus of the low-temperature polysilicon PSI doped therein as an impurity. This heavily-doped n-type layer PSI(n+) is high in electrical conductivity and thus virtually acts as a wiring portion. On the other hand, the PSI under the gate line GL is a p-type layer PSI(p) having boron doped thereinto as an impurity and acts as the so-called semiconductor layer, which exhibits a switching operation in such a way that it is in a conductive state when an ON voltage is applied to the gate line GL and is in a non-conductive state upon application of an OFF voltage thereto. In case the ON voltage is applied to the gate wiring line GL, the potential of an interface between the gate insulation film GI and the boron impurity-doped p-type layer PSI(p) at the lower part of the gate wiring line GL is inverted resulting in formation of a channel region, followed by transformation to n conductivity type to permit an ON current to flow in the TFT. This in turn results in flow of a current into the metal pixel electrode SPM to thereby charge up the liquid crystal capacitance and hold capacitance.

As shown in FIG. 4, the hold capacitance (also called the additional capacitance) Cadd is formed with the metal pixel electrode SPM as one electrode, with the interlayer dielectric film ILI serving as an insulating film, and with the prior stage gate wiring line GL serving as the other electrode. The metal pixel electrode SPM overlying the prior stage gate wiring line GL supplies a pixel voltage potential to the transparent pixel electrode SPT through a third contact hole CNT3 that is defined in the protective film PAS and organic protective film FPAS. While this metal pixel electrode SPM crosses or intersects the transparent common electrode CLT in its crank-like curved area, as seen in FIG. 1, this electrode crosses below the organic protective film FPAS underlying the transparent common electrode CLT, as shown in the cross-sectional structure of FIG. 4.

The hold capacitance Cadd is provided to retain the potential within an image display time period (hold period), which is determined by the liquid crystal capacitance with respect to a leakage current that increases due to electron-hole pairs, as produced by light irradiation owing to use of a backlight from the TFT glass substrate GLS1 side with respect to the polysilicon PSI of the TFT shown in the drawing. If this value can be set larger, then it is possible to successfully retain the uniformness on the display screen.

Figure 6:
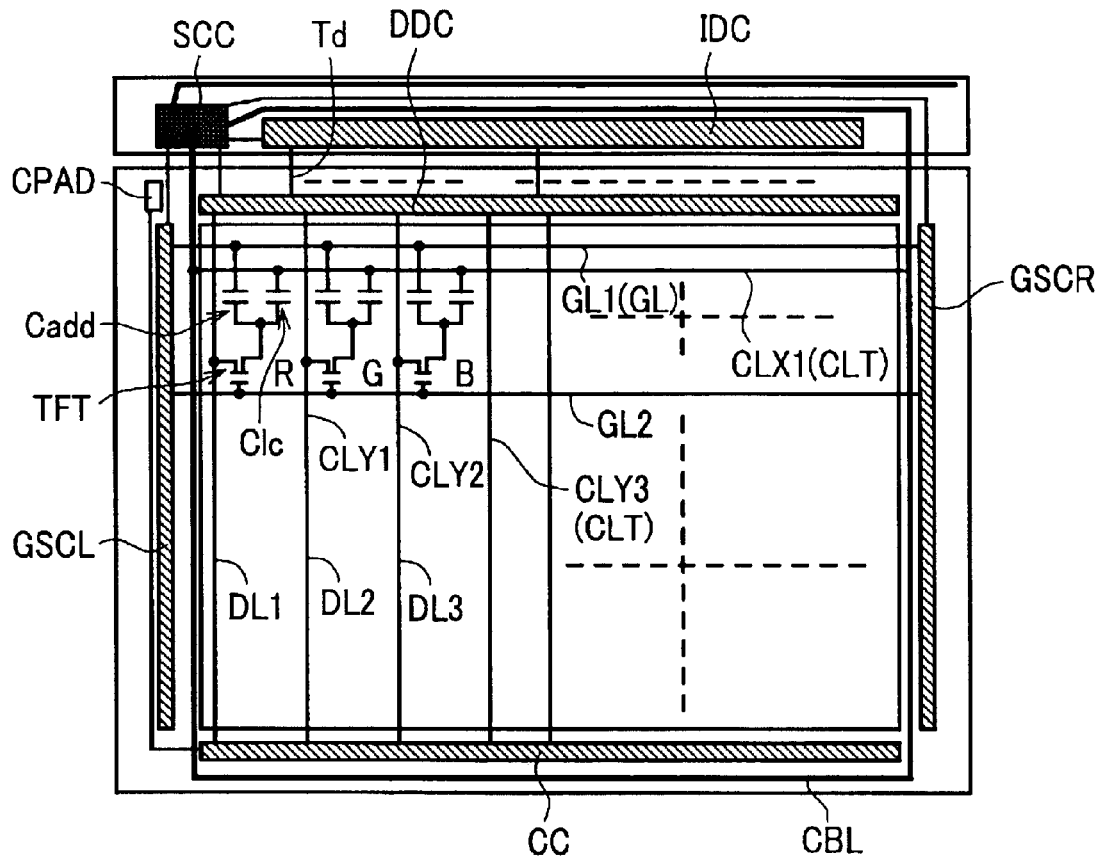
FIG. 6 is a diagrammatic plan view schematically representing an equivalent circuit of the TFT-LCD.

An equivalent circuit of a display matrix unit and its peripheral circuit are shown in FIG. 6. In this drawing, DL designates drain lines suffixed with numbers in a manner of DL1, DL2, DL3, etc. These numbers indicate drain wiring lines (image signal lines) within the display screen as counted from the left side of the screen. Suffixes R, G and B are added corresponding to red, green and blue pixels, respectively. GL denotes gate wiring lines GL with numbers added in a manner of GL1, GL2, GL3, etc. These numbers indicate gate lines within the display screen counted from the upper part thereof. Suffixes 1, 2, . . . are added in accordance with the sequence of scan timings. CLX and CLY denote common electrode wiring lines CLT, wherein lines CLX are suffixed with numbers in a manner of CLX1, CLX2, etc. These numbers indicate common electrode wiring lines within the display screen in the lateral direction as counted from the upper part thereof. On the other hand, CLY denotes common electrode wiring lines in the longitudinal direction, to which numbers are applied in a manner of CLY1, CLY2, etc. These numbers indicate the longitudinally extending common electrode wiring lines within the display screen as counted from the screen upper part. Although the above-noted common electrode wiring lines CLX, CLY are numbered as far as the equivalent circuit is concerned, actually these are transparent common electrodes CLT, as shown in FIG. 1, with CLX covering more than one gate wiring line end portion and CLY being a transparent electrode that covers a drain wiring line(s) DL, and these lines are laid out in a mesh-like form. Then, the are connected to a common electrode mother line CBL outside the display screen.

The gate wiring lines GL (suffixes omitted) are coupled to a scanning circuit GSCL on a glass substrate. Either a power supply voltage or a timing signal applied to such a scan circuit is supplied from a power supply and timing circuit SCC, which is formed on a PCB outside the glass substrate. In the above configuration, although the scan circuit on the glass substrate, which is constituted from low-temperature polysilicon TFTs, is electrically powered also from the right side GSLR of the right and left side ones with respect to a single gate line (scan line) in order to enhance redundancy, the power supply may alternatively be provided from one side in accordance with display screen sizes.

On the other hand, power feed is applied to the drain wiring lines DL from a signal circuit DDC that is constituted from low-temperature polysilicon TFTs 011 the glass substrate. This signal circuit DDC functions to distribute image data incoming from circuitry formed of image signal circuit ICs on the glass substrate in response to color data of R, G and B. Thus, the number of connection nodes from the signal circuit on the glass substrate is one third of the number of the drain wiring lines within the display screen.

Additionally, the common electrode wiring line is the transparent common electrode wiring line CLT in this embodiment. This common wiring line is tied within the mesh-like pixel, as shown in FIG. 1. CLX and CLY are drawn out to the right and left sides of the display screen, or alternatively in upward and downward directions, and are tied together to the common electrode mother line CBL, which is low in impedance, and then it is connected to SCC of the power supply and timing circuit IC. This common electrode supplies a common potential of pixels within the display screen.

The low-temperature polysilicon TFTs within the screen are n-type TFTs, each of which performs visual display by supplying, to a liquid crystal capacitance Clc that is formed between it and a common electrode wiring line CLT, a drain voltage (data) which is fed to a drain line DL at the timing of application of a gate voltage to a gate wiring line GL. In order to improve the ability to retain the potential of the liquid crystal capacitance Clc within a display period, a hold capacitance Cadd is formed. CC denotes a test circuit that is formed of more than one low-temperature polysilicon TFT for testing for electrical disconnection of drain wiring lines DL. CPAD denotes a test terminal.

Figure 7:
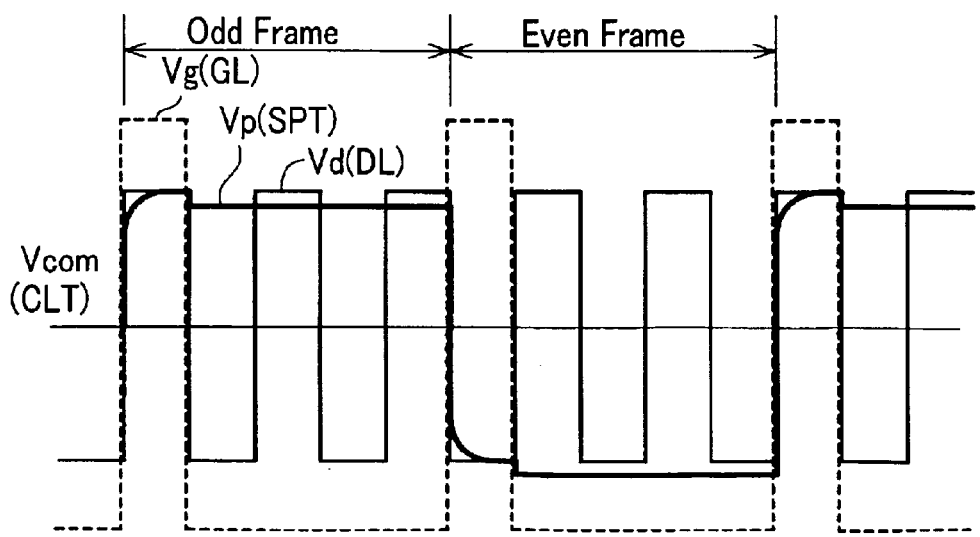
FIG. 7 is a timing chart showing a drive waveform of a pixel of the TFT-LCD.

FIG. 7 shows a drive signal waveform of the liquid crystal display device of this invention. Shown herein is an example in which the common electrode voltage Vcom is a DC voltage. A gate voltage Vg sequentially scans on a gate line basis, whereby a pixel TFT becomes in a turn-on (ON) state upon application of a voltage which is obtained by further adding the threshold voltage of the pixel's low-temperature polysilicon TFT to a drain potential Vd, resulting in chargeup to the liquid crystal capacitance Clc shown in FIG. 6. The common electrode voltage Vcom, gate voltage Vg and drain voltage Vg are supplied to the common electrode wiring line CLT, which make up the mesh-like common electrode wiring lines of FIG. 6, the gate wiring line GL and the drain wiring line DL, respectively. In this embodiment the drain voltage Vd is shown in the case of performing white display during liquid crystal displaying in a normally black mode, by way of example, wherein gate line selection is carried out on a line basis with inversion between positive and negative polarities being performed for the common electrode voltage Vcom once at a time whenever a line is selected. Although a pixel potential Vp is charged up to the liquid crystal capacitance Clc through a TFT, it will be inverted relative to the common electrode potential Vcom in odd-numbered and even-numbered frames. While the potential corresponding to an image is charged to the liquid crystal capacitance Clc when Vg becomes greater than Vd, upon selection of a gate wiring line with respect to the gate wiring line GL of a TFT at a specific address, the potential of the liquid crystal capacitance Clc must be retained until application of Vd that was inverted relative to the common electrode potential Vcom in the next frame, in the way stated above. This retention rate decreases with an increase in the turn-off current (leakage current) of the TFT. To avoid this, it is required to enlarge the hold capacitance Cadd of the equivalent circuit of FIG. 6.

In this embodiment, a dot inversion drive method is used. In this case, supposing that the drive signal waveform for the TFT that is connected to the drain wiring line DL1 of FIG. 6 is the same as that shown in FIG. 7, the drain voltage Vd is inverted with regard to the TFT that is connected to the drain wiring line DL2 of FIG. 6. More specifically, when a gate is selected (when Vg becomes higher than the common voltage Vcom), in case the drain voltage Vd is higher than the common voltage Vcom, the neighboring drain wiring line DL2 is supplied with the drain voltage Vd with its potential lower than that of the common voltage Vcom—that is, a voltage which is the same as that in an even-numbered frame with respect to the drain wiring line DL1. Accordingly, a pixel placed between the drain wiring line DL1 and drain wiring line DL2 is surrounded by a voltage of a different polarity and the same value; however, in this case, malfunction of the potential will no longer occur due to the fact that the metal pixel electrode SPM is laid out in a crank-like curved pattern, as shown in FIG. 1.

Embodiment 2

Figure 8:
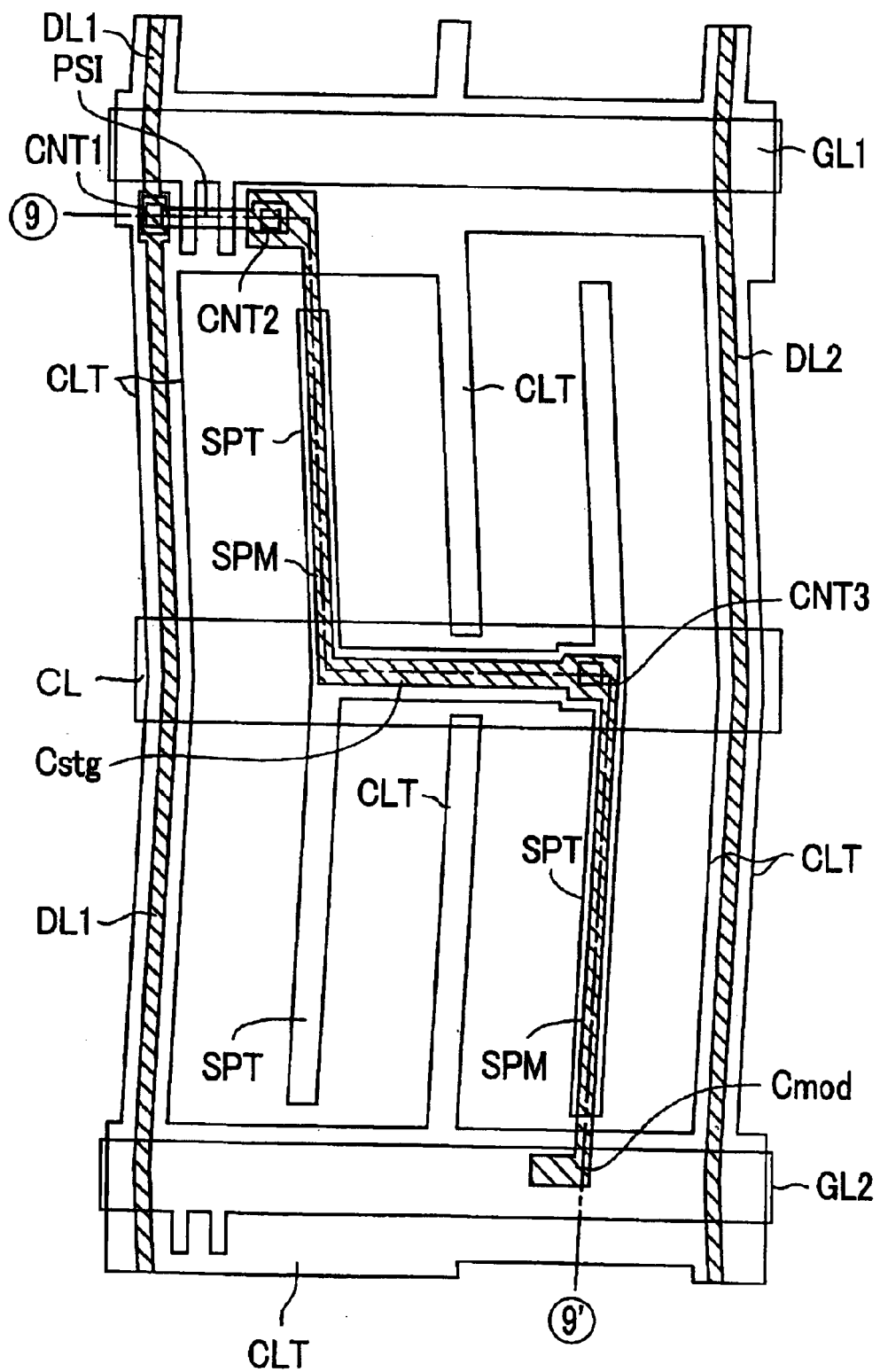
FIG. 8 is a diagrammatic plan view of a pixel of a TFT liquid crystal display device in accordance with another embodiment of the invention.
Figure 9:
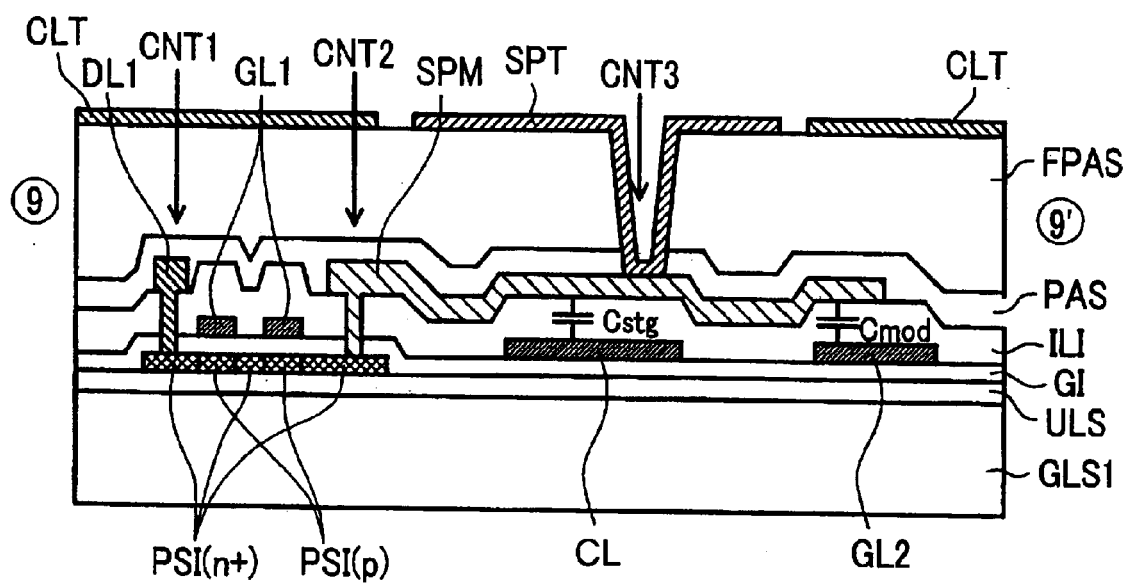
FIG. 9 is a sectional view taken along line 9–9' of FIG. 8.

FIG. 8 is a plan view of a pixel in accordance with a second embodiment of the invention. FIG. 9 shows a cross-section of the pixel as seen along a cut line 99' in FIG. 8. In these drawings, reference numerals are encircled in order to facilitate an identification of the section line. In addition, reference characters of the upper and lower gate wiring lines GL and right and left drain wiring lines DL which surround a single pixel have suffix numerals appended thereto for purposes of making clearer the order of scanning and the like.

FIG. 8 shows an IPS scheme pixel pattern having four main transmitting portions arranged in a direction transverse to the drain wiring lines DL in a way similar to the embodiment 1. Its significant feature over the embodiment 1 lies in the configuration and arrangement of the pixel electrode SPM. A single pixel area, which is surrounded by two neighboring gate wiring lines GL1, GL2 and two neighboring drain wiring lines DL1, DL2, is designed so that a hold capacitance wiring line CL, extending almost parallel to the gate wiring lines (GL1 or GL2), is formed in an almost central area between the neighboring gate wiring lines. A metal pixel electrode SPM, that is connected through a second contact hole CNT2 to a TFT, extends beneath a left hand transparent pixel electrode SPT up to the pixel center and then curves so as to overlap the hold capacitance wiring line CL, and then it extends under a right hand transparent pixel electrode SPT to a point which overlaps a gate wiring line GL2 at the next stage (shown on the lower side of FIG. 8).

The cross-sectional structure, which extends across mutually neighboring drain wiring lines DL in the four transmissive areas between the present stage gate wiring line GL1 (shown on the upper side of FIG. 8) for TFT turn-on drive and the hold capacitance wiring line CL in the aforementioned arrangement, and the sectional structure, which extends across neighboring drain wiring lines DL with respect to the four transmissive areas of the hold capacitance wiring line CL and the next-stage gate wiring line GL2, are identically the same as the corresponding structures of the embodiment 1 shown in FIGS. 2 and 3, respectively. Accordingly, in this embodiment also, a potential variation occurring due to a strong electric field, which penetrates the TFT glass substrate from the left-side drain wiring line DL1 and reaches the neighboring metal pixel electrode SPM in the areas of the present stage gate wiring line GL1 and hold capacitance wiring line CL, is cancelled out by an electric field from the metal pixel electrode SPM from the right-side drain wiring line DL2 in the area from the hold capacitance wiring line CL to the next-stage gate wiring line GL2, to thereby make it possible to obtain stabilized display images without suffering from any crosstalk, in particular when using the dot-inversion drive method. The hold capacitance wiring line CL extends across the pixel center portion, at which the transparent pixel electrode SPT and common electrode wiring line CLT are curved or bent, to thereby provide an area in which liquid crystal molecules rotate in mutually opposite directions without any appreciable decrease in aperture ratio. Furthermore, although the metal pixel electrode SPM also is cranked over the hold capacitance wiring line CL, this hardly acts as a factor that causes the aperture ratio to newly decrease.

An explanation will next be given of the role of a modification capacitance Cmod. In the arrangement shown in the plan view of FIG. 8, the TFT gate wiring lines GL are scanned in a line sequence fashion, in the order of the suffixes of the symbols shown in FIG. 8, in such a way that the transparent pixel electrode SPT finally permits the transfer of an image signal voltage (pixel potential) from the left-side drain wiring line DL1. The metal pixel electrode has two major functions, one of which is for forming the hold capacitance used to stabilize the image quality by positioning it to be stacked with the hold capacitance wiring line CL, and the other of which is to transfer the pixel potential toward the transparent pixel electrode SPT through a third contact hole CNT3 over the hold capacitance wiring line CL in the way stated previously. Thus, as far as these functions are concerned, the metal pixel electrode SPM is no longer required to extend up to a portion over the next-stage gate wiring line GL2. This is for preventing a malfunction that might otherwise occur due to a pixel potential decrease under the influence of parasitic capacitance components when the gate-on voltage of a TFT of the present stage gate wiring line GL1 behaves to drop down at the turn-off (OFF) voltage.

When the gate-on voltage is applied to the TFT that is coupled to the present stage gate wiring line GL1, an image voltage is applied to the transparent pixel electrode SPT. On the other hand, it has been known among those skilled in the art that the pixel voltage decreases at a rate equivalent to the ratio of the hold capacitance with a TFT parasitic capacitance value to the liquid crystal capacitance whenever the gate-on voltage changes to the OFF voltage, resulting in a decrease in image quality. This may be suppressed by extremely enlarging the value of such a hold capacitance (also called the storage capacitance) Cstg which is formed at a cross point between the metal pixel electrode SPM and the hold capacitance wiring line CL. However, the aperture ratio decreases.

The modification capacitance, which is arranged at the intersection between the metal pixel electrode SPM, that extends from the hold capacitance wiring line CL to the gate wiring line GL2, and the gate wiring line 0L2 stabilizes the image quality by performing the following operation.

When the gate voltage on the stage gate wiring line GL1 changes from the OFF voltage to the ON voltage, the TFT is driven to turn on, causing the pixel capacitance and hold capacitance Cstg to be charged up. In this case, although the pixel voltage potentially drops down at the time that the voltage of the gate wiring line GL1 on which the transparent pixel electrode SPT transfers an image voltage becomes equal to the OFF voltage, letting the modification capacitance Cmod be set equal in value to the TFT parasitic capacitance permits the next-stage gate wiring line GL2 to change from the OFF voltage to the ON voltage at the same time that the voltage of the present stage gate wiring line GL1 decreases in potential, whereby the pixel voltage is such that a potential increase and potential decrease cancel out each other, so that a stabilized operation is achievable without suffering from variations. In this way, it is possible to provide the intended liquid crystal display device with an increased aperture ratio, while eliminating crosstalk, by specifically designing the metal pixel electrode SPM in such a way as to extend from the present stage gate wiring line, below the transparent pixel electrode SPT adjacent to the left-side drain wiring line DL1, then cross the hold capacitance wiring line where it turns, and again extend beneath the transparent pixel electrode SPT adjacent to the right-side drain wiring line DL2, so as to finally reach the next-stage gate wiring line GL2.

FIG. 9 shows a cross-section as seen along cut line 9–9' of FIG. 8. The left side of this drawing is a sectional view of a TFT, wherein an image voltage from drain wiring line DL causes the p-type polysilicon layer PSI(p) to decrease in resistance upon application of the ON voltage to the gate wiring line GL1 of the TFT, causing its potential to be charged as a pixel potential to the liquid crystal capacitance and/or hold capacitance Cstg. The lower electrode of the hold capacitance Cstg is formed by the hold capacitance wiring line CL, that is formed using the same process and the same material as those of gate wiring lines GL; and, its upper electrode is a metal pixel electrode SPM, which is connected to a second contact hole CNT2 of the TFT. The transparent pixel electrode SPT is connected via a third contact hole CNT3 that is formed in organic protective film FPAS and protective film PAS at a location above the metal pixel electrode SPM. A planar pattern is designed to have an H-like shape, as shown in FIG. 8. The metal pixel electrode SPM further extends below the transparent pixel electrode SPT so as to reach the next-stage gate wiring line GL2; and, here, it is stacked with an interlayer dielectric film ILI sandwiched therebetween to thereby form the modification capacitance Cmod. The value of this modification capacitance Cmod is set at half of the capacitance of an inversion layer at the TFT's semiconductor layer PSI(p), for canceling a variation of the pixel potential during line-sequential scanning of the ON and OFF of the gate voltage in the way stated above.

It is obvious that, although each of the above-stated embodiments has been explained under an assumption that there are two electrodes, these may be replaced with three or more electrodes. Such changes and alterations are within the scope of the invention as far as the principal concept of the invention is employed therein.

Additionally, as apparent from FIG. 1, in the liquid crystal display device having a first substrate and a second substrate, which are disposed to face each other with a liquid crystal layer interposed therebetween, and also having on or above the first substrate a plurality of gate wiring lines and a plurality of drain wiring lines crossing the plurality of gate wiring lines in a matrix arrangement and thin-film transistors formed at respective cross points or intersections of the gate wiring lines and drain wiring lines, while a pixel is formed by an area that is surrounded by neighboring gate wiring lines and neighboring drain wiring lines, it is desired that (a) a plurality of pixel electrodes are provided, (b) at least two of the pixel electrodes have a first region that is a linear portion with a two-layer structure of upper and lower layers with a dielectric film sandwiched therebetween and a second region that is a linear portion as provided only at the upper part of the dielectric film, (c) the above-mentioned two pixel electrodes are different from each other in order of the first region and the second region of the pixel electrodes, (d) portions which are formed at a lower layer of the dielectric film making up the first region are connected together at the two pixel electrodes, (e) the distance between one pixel electrode of the two pixel electrodes and one of two drain wiring lines, which are disposed on the both sides of a pixel, is selected to be greater than twice the distance between it and the other drain wiring line, and (f) the distance between the other pixel electrode of the two pixel electrodes and the other of the two drain wiring lines, which are disposed on the both sides of the pixel, is greater than twice the distance between it and one drain wiring line. With such an arrangement, it becomes possible to more accurately suppress liquid crystals due to asymmetry, thus enabling achievement of further reduction of crosstalk.

Also note that a pixel electrode of the two pixel electrodes which is arranged at a lower layer than the insulating film should not always be made of metal and may alternatively be made of semiconductor materials when the need arises. A reason for this is as follows. Letting it have n+ type conductivity makes it possible to lower the resistance to a degree sufficient for signal supplement within a single pixel, and, therefore, semiconductor materials are treatable in a similar way to metals.

It has been described in detail that the use of the liquid crystal display device of the type mainly employing TFTs and the IFS scheme in accordance with the present invention makes it possible to provide a liquid crystal display device of high image quality with enhanced brightness and high display quality, plus increased aperture ratios, while precluding any crosstalk.

What is claimed is:

1. An active matrix type liquid crystal display device comprising:
   a first substrate and a second substrate disposed to face each other with a liquid crystal layer interposed therebetween;
   a plurality of gate wiring lines and a plurality of drain wiring lines crossing said plurality of gate wiring lines in a matrix form formed on the first substrate:
   thin-film transistors formed in a way corresponding to respective cross points of said gate wiring lines and said drain wiring lines;
   a plurality of pixels, each pixel being delimited by an area surrounded by neighboring gate wiring lines and neighboring drain wiring lines;
   wherein at least a first pixel electrode and a second pixel electrode are formed in a respective pixel, both the first pixel electrode and the second pixel electrode have a first area which is constituted by an upper pixel electrode portion and a lower pixel electrode portion with an insulating layer therebetween and a second area which is constituted by the upper pixel electrode portion formed over the insulating layer;
   wherein an order of the first area and the second area in an elongated direction of the first and second pixel electrodes is different between the first pixel electrode and the second pixel electrode; and
   wherein the lower pixel electrode portion of the first pixel electrode and the lower pixel electrode portion of the second pixel electrode are connected to each other.

2. The active matrix type liquid crystal display device according to claim 1, wherein a distance between one pixel electrode of the first and the second pixel electrodes and one of two drain wiring lines disposed on both sides of a pixel is greater than twice a distance relative to the other drain wiring line, whereas a distance between the other pixel electrode of the first and the second pixel electrodes and the other drain wiring line of the two drain wiring lines disposed on the both sides of the pixel is greater than twice a distance relative to the one drain wiring line.

3. The active matrix type liquid crystal display device according to claim 1, wherein said active matrix type liquid crystal display device is of the lateral electric field type and has at least one of the first and second pixel electrodes for forming a lateral electric field between it and any one of said common electrodes formed above said first substrate or a common wiring line.

4. The active matrix type liquid crystal display device according to claim 3, wherein the first and second pixel electrodes extend up to the other gate wiring line at which the first and second pixel electrodes are not connected to TFTs to thereby form a hold capacitance together with the other gate wiring line with the insulating film therebetween.

5. The active matrix type liquid crystal display device according to claim 1, wherein the first and the second pixel electrodes are bent at an angle within a range from about five (5) to twenty five (25) degrees in at an area where the lower pixel electrode portion of the first pixel electrode and the lower pixel electrode portion of the second pixel electrode are connected to each other.

6. The active matrix type liquid crystal display device according to claim 1, wherein a common electrode wiring line extending in substantially parallel to the gate wiring lines is formed in an area where the lower pixel electrode portion of the first pixel electrode and the lower pixel electrode portion of the second pixel electrode are connected to each other.

7. The active matrix type liquid crystal display device according to claim 1, wherein the upper pixel electrode portion is formed of a transparent electrode.

8. The active matrix type liquid crystal display device according to claim 1, the lower pixel electrode portion is formed of any one of a metal or a semiconductor material.

* * * * *